No. 729,682. PATENTED JUNE 2, 1903.
T. G. SELLECK.
TRUCK.
APPLICATION FILED MAY 19, 1902.
NO MODEL.
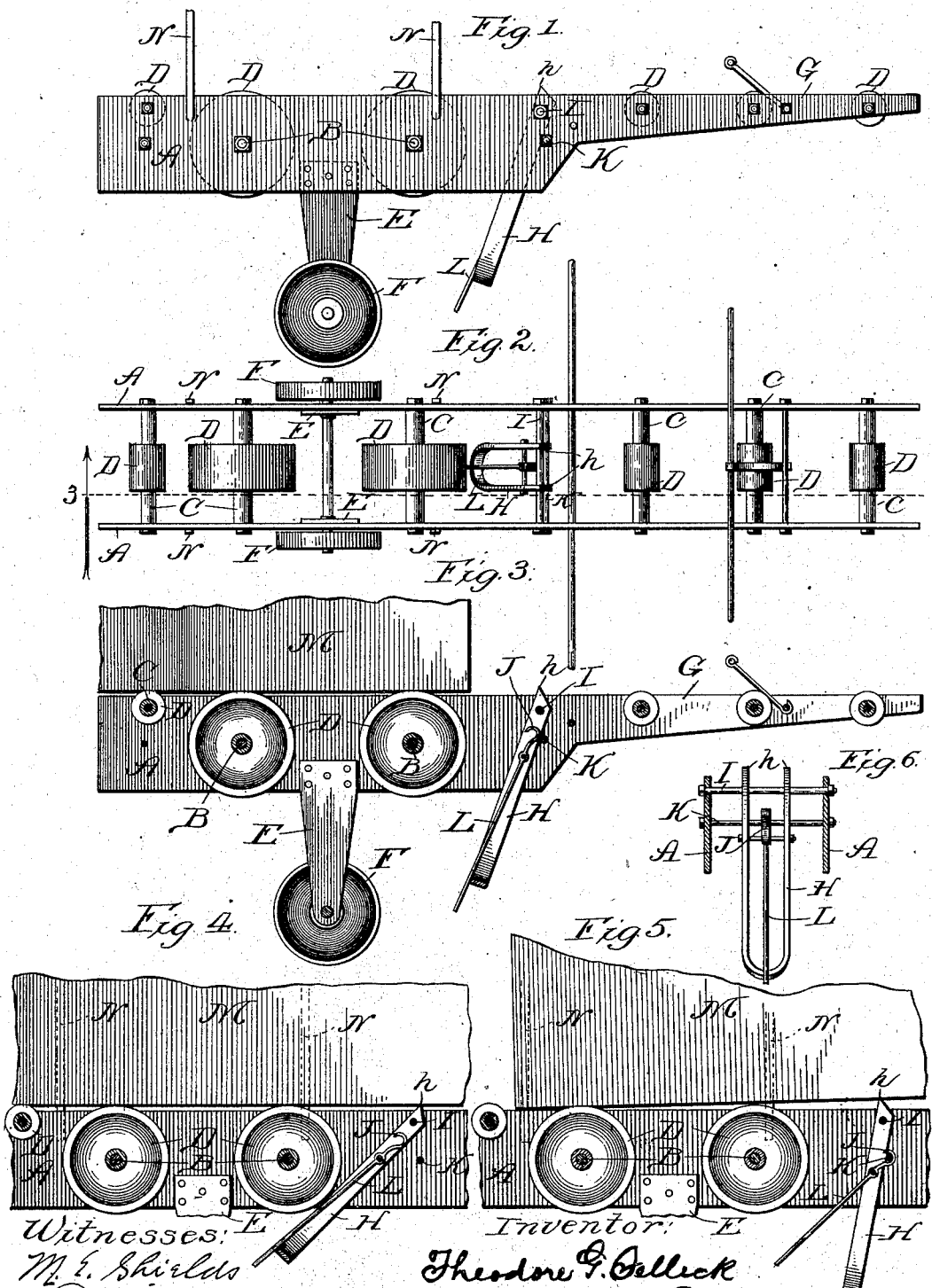

No. 729,682. Patented June 2, 1903.

UNITED STATES PATENT OFFICE.

THEODORE G. SELLECK, OF CHICAGO, ILLINOIS, ASSIGNOR TO ACME STEEL COMPANY, OF CHICAGO, ILLINOIS, A CORPORATION OF ILLINOIS.

TRUCK.

SPECIFICATION forming part of Letters Patent No. 729,682, dated June 2, 1903.

Application filed May 19, 1902. Serial No. 108,060. (No model.)

*To all whom it may concern:*

Be it known that I, THEODORE G. SELLECK, a citizen of the United States, residing at Chicago, in the county of Cook and State of Illinois, have invented certain new and useful Improvements in Trucks, of which the following is a specification.

My invention relates more particularly to trucks to be used in conveying charges of steel to a converting-furnace, especially of the type shown in my copending application for a furnace filed of even date herewith.

The object of my invention is to provide, first, a truck which shall facilitate the charging of a heated converting-furnace with previously-prepared charges of steel, and, second, to provide a pivoted truck with means for preventing heavy loads from sliding off the same. These and such other objects as may hereinafter appear are accomplished by the devices illustrated in the accompanying drawings, in which—

Figure 1 is a side elevation of my improved truck. Fig. 2 is a plan view thereof. Fig. 3 is a longitudinal section on the line 3 3 of Fig. 2 looking in the direction indicated by the arrows. Fig. 4 is a detail showing a box on my improved truck with the brake out of operation. Fig. 5 is a similar detail showing the brake in operation, and Fig. 6 is a detail of the brake.

Similar letters of reference indicate the same parts in the several figures of the drawings.

In its preferred form when constructed for the specific purposes previously noted my truck is composed of two plates A A, placed on edge and parallel with each other, connected together by tie-bolts B B B, some of said tie-bolts being provided with sleeves C and serving as journals for rollers D D D. The side plates A are carried by supports E, to which are journaled the truck-wheels F. The forward end of the truck is provided with a long overhanging and preferably narrowed portion or nose G, which is adapted to extend into the converting-boxes of my heated converting-furnace, but is of course adapted for use in any similar situations.

H is a brake constructed, preferably, in the form of a loop, which is pivoted upon I, which may also be one of the tie-bolts of the truck, and is provided with angular braking projections *h*. The downwardly-depending portion of the brake H should be of sufficient length to give a greatly-multiplied leverage at the extreme lower end as against the leverage between the pivot I and the projection or nose *h*. Pivoted to the brake H is a hook J, adapted to engage a cross-pin or tie-bolt K and provided with a handle L.

My truck is used as follows: A loaded box M is readily rolled onto the truck by means of the rollers D D and is confined laterally by the uprights N; but owing to the fact that the box M rests upon the rollers D the box would readily roll off of the truck unless the truck be at all times maintained perfectly level. To overcome this difficulty, I provide the brake H. As the box is slid onto the truck it engages and depresses the nose *h* of the brake H and the brake swings on its pivot I to the position shown in Fig. 4. Thereupon by means of the leverage afforded by the downwardly-depending portion of the brake H the lower portion of the brake is manually swung downwardly and forwardly to the position shown in Fig. 5, thereby causing the nose *h* to engage the under side of the box and to lift one end of it off of the rollers D, in which position it is held by throwing the hook J into engagement with the pin or tie-bolt K. In this position one end of the box M rests upon the two noses *h h* on the brake H and by reason of its weight has such frictional engagement therewith that it may not be readily moved lengthwise of the truck. When the truck has been brought to the furnace and the projecting nose G inserted in one of the furnace-boxes, the box M is slightly lifted by means of the brake H, the hook J is disengaged from the tie-bolt K by means of the handle L, and the brake released, whereupon it resumes the position shown in Fig. 4, and the box M, now resting upon the rollers D, is readily pushed forward off the truck and into the converting-boxes of the furnace.

Having thus described my invention, what I claim, and desire to secure by Letters Patent, is—

1. A truck provided with an elongated, overhanging end and a plurality of rollers on the bed of the truck, means for engaging a load carried by said truck and for partially lifting the same above the surface of said truck, substantially as described.

2. The combination with a truck of a brake-beam, pivoted below the surface of the bed of the truck, provided at its upper end with means having sharp ends for engaging and lifting an article resting upon the truck, and with means for supporting such article above its normal position upon the truck, substantially as described.

3. The combination with a truck of a brake, comprising a lever pivoted to the truck, arranged to have its long arm normally depend below the bed of the truck and to have its short arm extend above the bed of the truck, and means extending substantially parallel therewith and pivoted thereto for locking it in such position, substantially as described.

4. The combination with a supporting-surface of a brake, comprising a lever pivoted at a point below said surface so that its upper end may at will be depressed below or projected above said supporting-surface, a second lever pivoted thereto, and provided with a hook, and means adapted to be engaged by said hook, whereby said brake will be locked in position with its short arm extending above said supporting-surface, substantially as described.

5. The combination with a truck, comprising a pair of parallel supports, of a brake comprising a U-shaped lever pivoted adjacent to its upper ends to and at a point below the upper surface of said supports, a second lever pivoted between the arms of said U-shaped lever, and provided with a hook, and means for engaging said hook, whereby said U-shaped lever will be locked in position with its short arms projecting above the surface of said supports, substantially as described.

THEODORE G. SELLECK.

Witnesses:
O. R. BARNETT,
M. E. SHIELDS.